US012772225B2

(12) United States Patent
Dhere et al.

(10) Patent No.: US 12,772,225 B2
(45) Date of Patent: Oct. 20, 2026

(54) CO-SCHEDULED INTERFERENCE UE PRESENCE SIGNALING AND MODULATION ORDER DETECTION

(71) Applicant: Nokia Technologies Oy, Espoo (FI)

(72) Inventors: Amol Dhere, Gistrup (DK); Stig Blücher Brink, Aalborg (DK); Karsten Petersen, Aalborg (DK); Axel Mueller, Massy (FR)

(73) Assignee: Nokia Technologies Oy, Espoo (FI)

( * ) Notice: Subject to any disclaimer, the term of this patent is extended or adjusted under 35 U.S.C. 154(b) by 250 days.

(21) Appl. No.: 18/784,191

(22) Filed: Jul. 25, 2024

(65) Prior Publication Data

US 2025/0039854 A1 Jan. 30, 2025

Related U.S. Application Data

(60) Provisional application No. 63/529,262, filed on Jul. 27, 2023.

(51) Int. Cl.
*H04W 72/0453* (2023.01)
*H04W 72/232* (2023.01)

(52) U.S. Cl.
CPC ..... *H04W 72/0453* (2013.01); *H04W 72/232* (2023.01)

(58) Field of Classification Search
CPC ........... H04W 72/0453; H04W 72/232; H04W 72/231; H04W 72/23; H04L 5/0051; H04L 5/003; H04B 7/0452
USPC .................................................. 370/329–330
See application file for complete search history.

(56) References Cited

U.S. PATENT DOCUMENTS

| | | | | |
|---|---|---|---|---|
| 2019/0246381 A1* | 8/2019 | Kim | H04W 72/0473 | |
| 2019/0281487 A1* | 9/2019 | Liu | H04L 1/0026 | |
| 2019/0312621 A1* | 10/2019 | Nam | H04W 72/23 | |
| 2020/0106580 A1* | 4/2020 | Yum | H04W 72/0453 | |
| 2020/0389218 A1* | 12/2020 | Faxér | H04L 5/0053 | |
| 2021/0167919 A1* | 6/2021 | Ma | H04L 5/0044 | |
| 2021/0329614 A1* | 10/2021 | Park | H04L 1/0027 | |
| 2022/0052736 A1* | 2/2022 | Gao | H04B 7/0626 | |
| 2023/0163897 A1* | 5/2023 | Dimou | H04L 1/1854 | 370/330 |

* cited by examiner

*Primary Examiner* — Candal Elpenord
(74) *Attorney, Agent, or Firm* — Barta Jones, PLLC

(57) ABSTRACT

An apparatus configured to: receive, from a network node, a configuration for one or more resource elements having zero power; receive downlink control information, wherein the downlink control information comprises, at least, an aperiodic indication for triggering resource elements having zero power; and determine a number of co-scheduled user equipments in a physical downlink shared channel based, at least partially, on at least one of: an index associated with the one or more resource elements, a number of the one or more resource elements, or a number of the one or more resource elements triggered with the aperiodic indication; and identify co-scheduled-UE interferer information based on the number of co-scheduled-UEs and the resource elements having zero power. The co-scheduled-UE interferer information includes determination of the MO, FDRA and DMRS ports of each co-scheduled UE.

20 Claims, 10 Drawing Sheets

CO-SCHEDULED INTERFERENCE UE PRESENCE SIGNALING AND MODULATION ORDER DETECTION

TECHNICAL FIELD

The example and non-limiting embodiments relate generally to detection of parameters related to interfering co-scheduled UEs and, more particularly, to modulation order detection with respect to a plurality of co-scheduled UEs.

BACKGROUND

It is known, in multi-user multiple input multiple output (MU-MMIMO) operation, for a target UE to receive network assisted signaling and perform blind detection with respect to a modulation order of a co-scheduled UE.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive, from a network node, a configuration for one or more resource elements having zero power; receive downlink control information, wherein the downlink control information comprises, at least, an aperiodic indication for triggering resource elements having zero power; and determine a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one aspect, a method comprising: receiving, with a user equipment from a network node, a configuration for one or more resource elements having zero power; receiving downlink control information, wherein the downlink control information comprises, at least, an aperiodic indication for triggering resource elements having zero power; and determining a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one aspect, an apparatus comprising means for: receiving, from a network node, a configuration for one or more resource elements having zero power; receiving downlink control information, wherein the downlink control information comprises, at least, an aperiodic indication for triggering resource elements having zero power; and determining a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one aspect, a non-transitory computer-readable medium comprising program instructions stored thereon for performing at least the following: causing receiving, from a network node, of a configuration for one or more resource elements having zero power; causing receiving of downlink control information, wherein the downlink control information comprises, at least, an aperiodic indication for triggering resource elements having zero power; and causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one aspect, an apparatus comprising: at least one processor; and at least one memory storing instructions that, when executed by the at least one processor, cause the apparatus at least to: evaluate co-scheduled user equipment interference in a multi-user multiple input multiple output slot with respect to a target user equipment; transmit, to a target user equipment, a configuration for one or more resource elements having zero power based, at least partially, on the evaluated co-scheduled user equipment interference; and transmit, to the target user equipment, downlink control information, wherein the downlink control information comprises, at least, an aperiodic indication for triggering resource elements having zero power.

In accordance with one aspect, a method comprising: evaluating, with a network node, co-scheduled user equipment interference in a multi-user multiple input multiple output slot with respect to a target user equipment; transmitting, to a target user equipment, a configuration for one or more resource elements having zero power based, at least partially, on the evaluated co-scheduled user equipment interference; and transmitting, to the target user equipment, downlink control information, wherein the downlink control information comprises, at least, an aperiodic indication for triggering resource elements having zero power.

In accordance with one aspect, an apparatus comprising means for: evaluating co-scheduled user equipment interference in a multi-user multiple input multiple output slot with respect to a target user equipment; transmitting, to a target user equipment, a configuration for one or more resource elements having zero power based, at least partially, on the evaluated co-scheduled user equipment interference; and transmitting, to the target user equipment, downlink control information, wherein the downlink control information comprises, at least, an aperiodic indication for triggering resource elements having zero power.

In accordance with one aspect, a non-transitory computer-readable medium comprising program instructions stored thereon for performing at least the following: evaluating co-scheduled user equipment interference in a multi-user multiple input multiple output slot with respect to a target user equipment; causing transmitting, to a target user equipment, of a configuration for one or more resource elements having zero power based, at least partially, on the evaluated co-scheduled user equipment interference; and causing transmitting, to the target user equipment, of downlink control information, wherein the downlink control information comprises, at least, an aperiodic indication for triggering resource elements having zero power.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
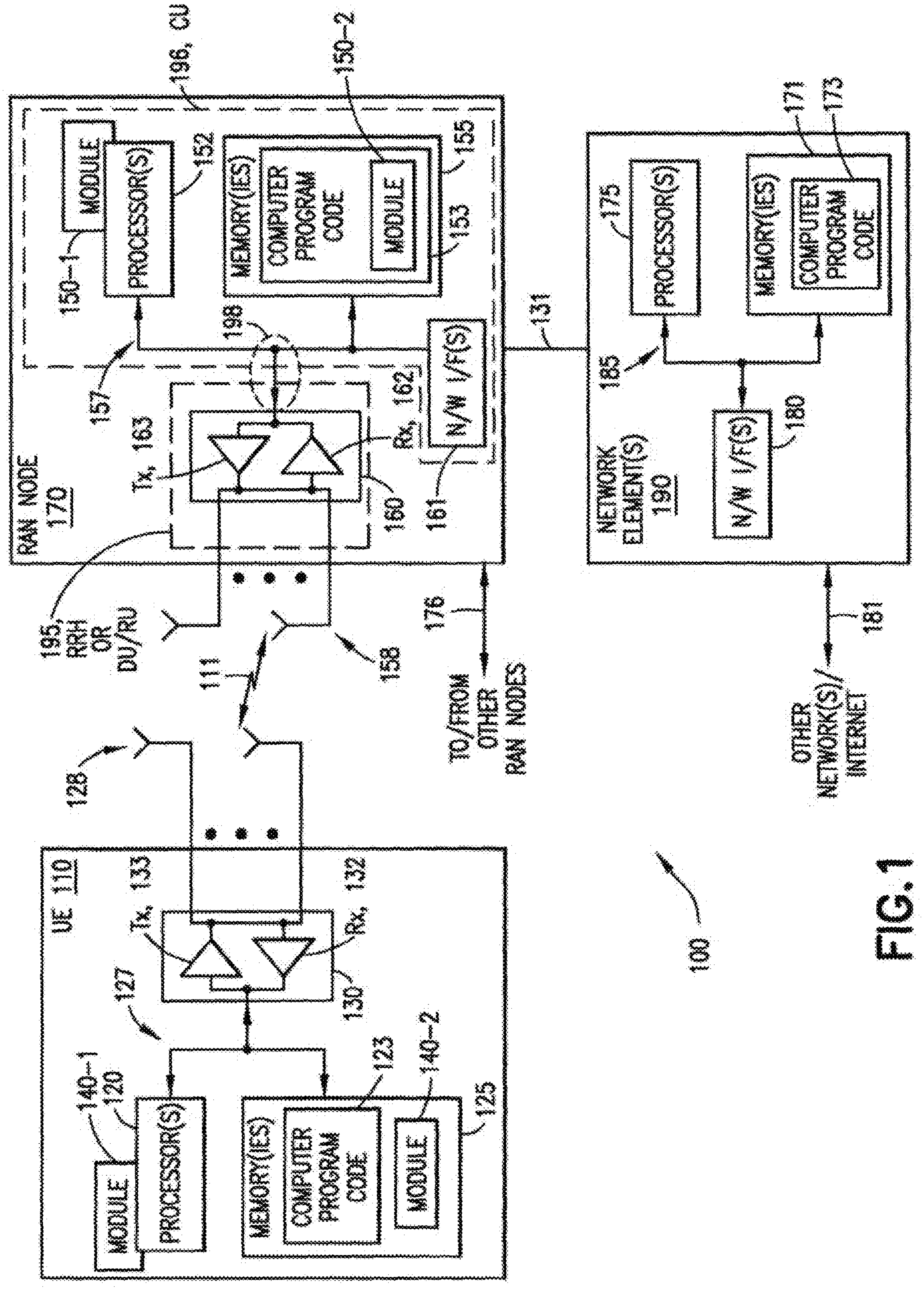
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
BLER block error rate
CHBW channel bandwidth
cRAN cloud radio access network
CU central unit
DCI downlink control information
DL downlink
DMRS demodulation reference signal
DU distributed unit
E-MMSE-IRC interference aware MMSE-IRC
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDRA frequency domain resource allocation
gNB (or gNodeB) base station for 5G/NR, i.e., a node providing NR user plane and control plane protocol terminations towards the UE, and connected via the NG interface to the 5GC
I/F interface
I/Q in-phase and quadrature
L1 layer 1
LTE long term evolution
MAC medium access control
MCS modulation and coding scheme
MME mobility management entity
MMSE minimum mean squared error
MMSE-IRC minimum mean squared error-interference rejection combiner
MO modulation order
MU-MIMO multi-user multiple input multiple output
ng or NG new generation
ng-eNB or NG-eNB new generation eNB
NR new radio
N/W or NW network
NWA network assisted
O-RAN open radio access network
PDCP packet data convergence protocol
PDSCH physical downlink shared channel
PHY physical layer
PRB physical resource block
QAM quadrature amplitude modulation
QPSK quadrature phase shift keying
QR-DM QR decomposition based M-algorithm
QR-MLD QR decomposition based maximum likelihood detection
RAN radio access network
RE resource element
RF radio frequency
RLC radio link control
R-ML reduced complexity most likelihood
RRC radio resource control
RRH remote radio head
RS reference signal
RU radio unit
Rx receiver
SD sphere detection
SDAP service data adaptation protocol
SGW serving gateway
SMF session management function
SU-MIMO single user multiple input multiple output
TDRA time domain resource allocation
Tx transmitter
UE user equipment (e.g., a wireless, typically mobile device)
UPF user plane function
VNR virtualized network function
ZP-CSI-RS zero power channel state information reference signal Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to downlink (DL) multi-user multiple input multiple output (MU-MIMO). In DL MU-MIMO, multiple UEs may be spatially multiplexed on the same time/frequency resources. In the ongoing discussion in 3GPP, advanced interference aware receivers for Downlink MU-MIMO detection are being studied for defining minimum demodulation performance requirements.

The candidate interference aware advanced receiver for DL MU-MIMO is a reduced complexity most likelihood (R-ML) receiver. This type of receiver uses complexity minimizing techniques to achieve near to full maximum likelihood joint detection of target and interference UEs MIMO layers. There are several known implementations of R-ML (e.g. sphere detection (SD), QR decomposition based M-algorithm (QR-DM), QR decomposition based maximum likelihood detection (QR-MLD), etc.).

Another advanced receiver is the interference aware minimum mean squared error-interference rejection combiner (E-MMSE-IRC) receiver. While the R-ML receiver and the E-MMSE-IRC receiver are discussed in the present disclosure, this is not limiting; other receivers may be used in the case of DL MU-MIMO and/or in combination with example embodiments of the present disclosure.

In the case of DL MU-MIMO, there may always be interference. To enable these advanced receivers for MU-MIMO, knowledge of multiple parameters of the interfering UEs' layers is required, such as: DMRS sequence, interference DMRS ports, frequency domain resource allocation (FDRA), time domain resource allocation (TDRA), precoding granularity, and/or modulation order (MO). The FDRA of co-scheduled UEs may be full or partial as compared to target UEs FDRA causing different amount(s) of interference in target UEs FDRA parts in a MU-MIMO scenario. The MO of the interference MIMO layers may be required for the R-ML receiver. A target UE (i.e. a UE that is the victim of interference) may know these parameters about itself, and may need to know one or more of these parameters about other, interfering co-scheduled UEs in order to mitigate the interference.

In the present disclosure, the terms "target UE" and "victim UE" may be used interchangeably to refer to a UE that is detecting/experiencing interference from other signal(s) meant for other co-scheduled UE(s) in a DL MU-MIMO scenario, for example when the target UE is attempting to receive from the NW.

Features as described herein may generally relate to network assisted (NWA) signaling. Both blind detection of the MO by the target UE, as well as NWA signaling of MO, are currently being discussed in 3GPP. Signaling for MO may be as follows:

TABLE 1

| Bit field mapped to index | Content |
|---|---|
| 0 | No co-scheduled UE(s) which has same DMRS sequence as target UE exists |
| 1 | In all the PRBs allocated to the target UE, all the co-scheduled UE(s), which has the same DMRS sequence as the target UE, have QPSK scheduled |
| 2 | In all the PRBs allocated to the target UE, all the co-scheduled UE(s), which has the same DMRS sequence as the target UE, have 16 QAM scheduled |
| 3 | In all the PRBs allocated to the target UE, all the co-scheduled UE(s), which has the same DMRS sequence as the target UE, have 64 QAM scheduled |
| 4 | In all the PRBs allocated to the target UE, all the co-scheduled UE(s), which has the same DMRS sequence as the target UE, have 256 QAM scheduled |
| 5 | In all the PRBs allocated to the target UE, all the co-scheduled UE(s), which has the same DMRS sequence as the target UE, have 1024 QAM scheduled |
| 6 | Not covered by cases corresponding to index 0~5. In each individual PRB allocated to the target UE, the following condition is satisfied: Only single modulation order is allocated for the co-scheduled UE(s) which has the same DMRS sequence as the target UE, if the co-scheduled UE(s) exist |
| 7 | Others |

(1) The existence of MU-MIMO DCI signalling is configured by RRC signalling.
(2) The field is intended to be included in a DCI which can be based on the format 1_1.

As illustrated in TABLE 1, examples of MO may include quadrature phase shift keying (QPSK), 16 quadrature amplitude modulation (QAM), 64 QAM, 256 QAM, and 1024 QAM. These examples are not limiting; other MO may be possible.

As can be seen when the gNB/scheduler has information about co-scheduled UE's MO, as in the example of TABLE 1, it may include this information in the downlink control information (DCI) with values 1 to 5, when there is a single MO across all interference ports using the same DMRS sequence as target UE.

However, in some cases other values may be signaled.

For example, if the co-UE MO information is not available at the gNB/scheduler (i.e. the gNB is not aware of the information), the gNB may signal a value of 6 even when a single co-scheduled UE is present.

For example, if the co-UE uses another DMRS sequence, the gNB may signal a value of 0 even for a single co-scheduled UE.

For example, in the case of two co-UEs across different parts of target UE's FDRA, the gNB may signal a value of 6 if they have different modulation order.

For example, if the case of two co-UEs occupying the entire FDRA of the target UE, but each having their own DMRS ports, the gNB may signal a value of 7 if they have different modulation orders.

For example, in the case of two co-UEs with full FDRA and a 1st UE using the same DMRS sequence, while the 2nd UE uses another DMRS sequence, a value of 1 to 5 may be signaled for the 1st UE only. The target UE may then need to blindly detect MO of the 2nd co-UE, which is using another DMRS sequence.

Accordingly, it may be noted that this DCI NWA signaling may be useful for informing a target UE about a single UE that is causing interference, but may not provide enough information when there is more than one interfering UE, for example two interfering UEs (i.e. in a case where there is one target UE and two interfering UEs that are co-scheduled in a different frequency port). For example, the NW may not be able to indicate to the target UE the exact MO used by each of two interfering UEs.

In addition, as per 3GPP discussions, RRC signaling to indicate the modulation and coding scheme (MCS) table being used for the co-UE may be useful.

In the present disclosure, the terms "co-scheduled UE" and "co-UE" may be used interchangeably to refer to a UE whose DL signal(s) acts as interference with respect to a DL signal(s) received at a target UE.

Features as described herein may generally relate to FDRA and MO detection with two co-scheduled UEs. With two interfering UEs, it may be difficult to determine the exact MO of each interfering UE. 3GPP is considering study of a use case in which two co-UE have half bandwidth FDRA each. For example, Co-UE1 may be spatially multiplexed to a first half (0-25 PRBs) of the channel bandwidth (CHBW) allocated to the Target UE (52 PRBs), while Co-UE2 may be spatially multiplexed to a second half (26-51 PRBs) of the channel bandwidth allocated to the Target UE (52 PRBs). Each of Co-UE1 and Co-UE2 may have a different MO (i.e. QPSK, 16 QAM). The DCI value of 6 (see, e.g., TABLE 1) may be signaled by the gNB to the target UE. Then, the target UE may have to detect that there are two separate co-UEs in each half of its FDRA, and then detect the MO of each co-UE.

Features as described herein may generally relate to aided blind detection of MO, for example with respect to the R-ML receiver. Blind MO detection is complex, and the performance is not good enough to guarantee 10% block error rate (BLER) in some cases, especially with higher MO. In other words, blind detection may impact throughput. T-doc R4-2307466 introduced a special zero power channel state information reference signal (ZP-CSI-RS), which repeats in every MU-MIMO slot for aiding blind detection of the co-UE's MO.

The use of resource elements (RE) with zero power may make it easier for the target UE to detect the MO of the interfering UE(s). The ZP-CSI-RS may be transmitted periodically or aperiodically.

This special ZP-CSI-RS, repeated in every MU-MIMO slot, is the subject of U.S. 63/461,477, here incorporated by reference in its entirety.

As discussed above, blind co-UE FDRA detection may not be able to distinguish between presence of 1 or 2 co-UEs. In other words, the UE may not be able to determine how may interfering co-UEs are present.

As discussed above, in some cases, the gNB may not be able to signal the exact MO of co-scheduled-UEs to the target UE, but may give information about presence of a single MO within each part of the FDRA of the target UE. In these cases, the target UE may need to blindly detect the single MO for each part of its FDRA if it wants to use the R-ML receiver. This may especially be an issue when there are two interfering co-UEs.

As discussed above, blind MO detection is complex, and performance is not good enough to guarantee 10% BLER in all cases.

As discussed above, aid in the form of ZP-CSI-RS may provide very few clean REs (i.e. with zero power) to detect MO. For example, only thirteen REs may be provided if there are two separate co-UEs in each half of the FDRA.

In an example embodiment, a network node, gNB, or scheduler may provide aid for MO detection (ZP-CSI-RS), and at the same time, tell the UE about the number of co-scheduled UEs present.

In an example embodiment, the gNB may provide ZP-CSI-RS. In an example embodiment, the gNB may configure one or more single port aperiodic ZP-CSI-RS resources using RRC messaging in PDSCH-config IE. If a single co-UE will be present, then a single resource may be configured. If up to two co-UE are present, then two resources may be configured. Aperiodic ZP-CSI-RS may be triggered using DCI (e.g. using format 1_1) in a MU-MIMO slot, for example to schedule DL. Zero power transmission may be triggered. Alternatively, dual power transmission may be triggered.

In some scenarios, a DCI value may not be able to indicate the MO of all the interfering co-UEs. In an example embodiment, if no co-UE is present, then no ZP-CSI-RS resource may be triggered. In an example embodiment, if a single co-UE is present, then the first ZP-CSI-RS resource may be triggered. In an example embodiment, if two co-UEs are present, then the second ZP-CSI-RS resource may be triggered.

A technical effect of example embodiments of the present disclosure may be to help determine the FDRA and interference ports belonging to different co-UEs based on information about the number of co-scheduled UEs.

A technical effect of example embodiments of the present disclosure may be to aid the detection of MO by providing information about part of FDRA, DMRS ports to use for MO detection of each co-UE.

In an example embodiment, a UE may perform MO detection using very few ZP-CSI-RS REs. In an example embodiment, the UE may determine which ports and bandwidth resources are assigned/allocated to each interfering co-UE.

In an example embodiment, a target UE may use an aided MO detection method. In an example embodiment, based on the information about the number of co-scheduled UEs received by the UE, the received DCI value for MO (e.g. 0, 6, or 7, or any value that indicates that the target UE is expected to do blind detection concerning the MO), and the detected FDRA, DMRS ports, the UE may determine the FDRA of each co-UE and its DMRS ports.

In an example embodiment, the UE may obtain channel estimates for the co-UE DMRS ports and equalize (e.g. using MMSE-IRC) the REs belonging to the ZP-CSI-RS on each interference port and its FDRA. Then, the UE may attempt to detect one co-UE at a time.

In an example embodiment, based on information received in RRC message(s) about the MCS table, the UE may construct a special custom grid corresponding to the maximum MO possible for co-UEs.

In an example embodiment, the UE may slice the equalizer output for each interference port based on the custom grid.

In an example embodiment, the UE may use predetermined fingerprints for each possible MO to detect the interference ports MO that is most likely. In other words, the UE may determine which MO fingerprint matches best with the custom grid.

A technical effect of example embodiments of the present disclosure may be to provide a simple, reliable, and low complexity method to detect MO of interference ports which looks at only the few ZP-CSI-RS REs.

Figure 2:
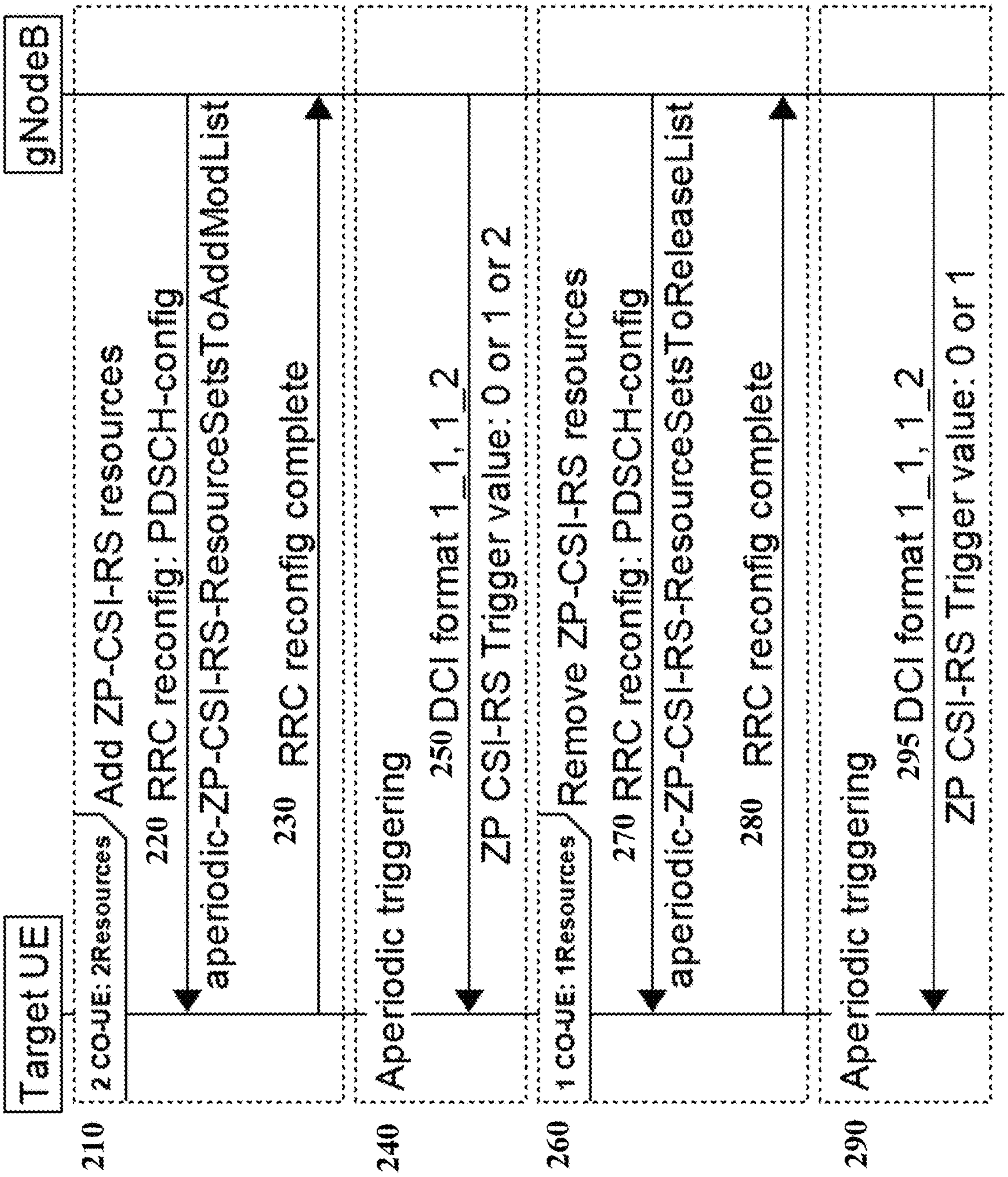
FIG. 2 is a diagram illustrating features as described herein.

Referring now to FIG. 2, illustrated is a sequence chart for aperiodic provisioning of ZP-CSI-RS for MO detection, for example according to an example embodiment of the present disclosure.

At 210, there may be 2 co-UEs, in addition to the target UE. ZP-CSI-RS resources may be added to address this scenario. At 220, the gNB may transmit, to the target UE, an RRC reconfiguration message, which may include PDSCH-config and/or aperiodic-ZP-CSI-RS-ResourceSetsToAddModList. As a result, the target UE may be configured with up to two ZP-CSI-RS resources. The number of co-UEs present may be indicated by the number of ZP-CSI-RS resources configured. For example, the RRC reconfiguration message may configure the UE with a set of resource elements that belong together and may be triggered by a single trigger. At 230, the target UE may transmit, to the gNB, an RRC reconfiguration complete message.

At 240, aperiodic triggering may be performed. The aperiodic trigger may inform the UE about the number of co-scheduled UEs. This information may be vital for mapping FDRA parts and DMRS ports to each co-scheduled UE. At 250, the gNB may transmit, to the target UE, DCI with format 1_1 or 1_2. The DCI may include a ZP-CSI-RS trigger value of 0, 1, or 2. The ZP-CSI-RS trigger value may trigger one or more of the configured ZP-CSI-RS resources. The number of ZP-CSI-RS resources triggered may indicate the number of co-UEs present. Additionally or alternatively, the DCI may include an index of a set of resource elements to be triggered.

At 260, ZP-CSI-RS resources may be removed. At 270, the gNB may transmit, to the target UE, an RRC reconfiguration message which may include PDSCH-config and/or aperiodic-ZP-CSI-RS-ResourceSetsToReleaseList. As a result, the target UE may be configured with fewer ZP-CSI-RS resources than previously. The number of co-UEs present may be indicated by the number of ZP-CSI-RS resources configured. In the example of FIG. 2, a single ZP-CSI-RS may be removed, which may indicate that only one co-UE is present. At 280, the target UE may transmit, to the gNB, an RRC reconfiguration complete message.

Optionally, at 290, aperiodic triggering may be performed after ZP-CSI-RS resources are removed at 260. For example, at 295, the gNB may transmit, to the target UE, DCI with format 1_1 or 1_2. The DCI may include a ZP-CSI-RS trigger value of 0 or 1. The ZP-CSI-RS trigger value may trigger one or more of the configured ZP-CSI-RS resources. The number of ZP-CSI-RS resources triggered may indicate the number of co-UEs present.

It should be noted that the example of FIG. 2 is not limiting; the steps may be performed in a different order, and/or additional steps may be performed.

In an example embodiment, the UE may determine interference ports and FDRA associated with co-scheduled UE(s). In an example embodiment, information from received DCI about MO may be combined with the information about the number of co-scheduled UEs and detected interference DMRS ports and FDRA parts.

For example, the UE may receive DCI indicating MO value: 0, Number of co-UEs: 0. The UE may determine that no co-UE is present (i.e. SU-MIMO). This may distinguish from the case of co-UEs with other DMRS sequence.

For example, the UE may receive DCI indicating MO value: 1, Number of co-UEs: 2, Detected DMRS ports same sequence: 1001, 1002, Detected DMRS port other sequence: None, Detected FDRA: Full. The UE may determine the following parameters for the two co-UEs: Co-UE 1 parameters: DMRS port 1001, Full FDRA, Uses QPSK; Co-UE 2 parameters: DMRS port 1002, Full FDRA, Uses QPSK.

For example, the UE may receive DCI indicating MO value: 1, Number of co-UEs: 2, Detected DMRS ports same sequence: 1001, Detected DMRS port other sequence: 1002, Detected FDRA: Full. The UE may determine the following parameters for the two co-UEs: Co-UE 1 parameters: DMRS port 1001, Full FDRA, Uses QPSK; Co-UE 2 parameters: DMRS port 1002, Full FDRA, MO detection. MO detection may be performed based on zero power REs.

For example, the UE may receive DCI indicating MO value: 6, Number of co-UEs: 2, Detected DMRS ports same sequence: 1001, Detected DMRS port other sequence: None, Detected FDRA: Full. The UE may determine the following parameters for the two co-UEs: Co-UE 1 parameters: DMRS port 1001, First Half FDRA, MO detection; Co-UE 2 parameters: DMRS port 1001, Second Half FDRA, MO detection. MO detection may be performed based on zero power REs.

For example, the UE may receive DCI indicating MO value: 0, Number of co-UEs: 2, Detected DMRS ports same sequence: None, Detected DMRS port other sequence: 1002, Detected FDRA: Full. The UE may determine the following parameters for the two co-UEs: Co-UE 1 parameters: DMRS port 1002, First Half FDRA, MO detection; Co-UE 2 parameters: DMRS port 1002, Second Half FDRA, MO detection. MO detection may be performed based on zero power REs.

For example, the UE may receive DCI indicating MO value: 0, Number of co-UEs: 1, Detected DMRS ports same sequence: None, Detected DMRS port other sequence: 1002, Detected FDRA: Full. The UE may determine the following parameters for the one co-UE: Co-UE 1 parameters: DMRS port 1002, Full FDRA, MO detection. MO detection may be performed based on zero power REs.

For example, the UE may receive DCI indicating MO value: 6, Number of co-UEs: 1, Detected DMRS ports same sequence: 1001, Detected DMRS port other sequence: None, Detected FDRA: Full. The UE may determine the following parameters for the one co-UE: Co-UE 1 parameters: DMRS port 1001, Full FDRA, MO detection. MO detection may be performed based on zero power REs.

In an example embodiment, the UE may perform detection grid construction. The 3GPP OFDM modulation schemes for LTE, 5G, 6G and beyond, e.g., QPSK (4-QAM), 16-QAM, 64-QAM, 256-QAM etc., may be represented in a two-dimensional Cartesian plane known as the In-phase and Quadrature (I/Q) constellation diagram. In general, this holds true for both square and any other QAM modulation scheme. Each symbol is represented by a single constellation point. These I/Q points are clustered together in the constellation diagram forming a signature, or "fingerprint", which has unique characteristics for each of the possible M-QAM modulation schemes, where M is the order to be determined.

To estimate the order of the modulation scheme, a custom detection constellation grid may be constructed for identification of the constellation fingerprint of the received symbols. The custom grid may be constructed by including additional grid points that are located halfway between the grid points for a particular modulation order, M.

In the following, two example methods are described for construction of the special detection constellation grid.

Figure 3:
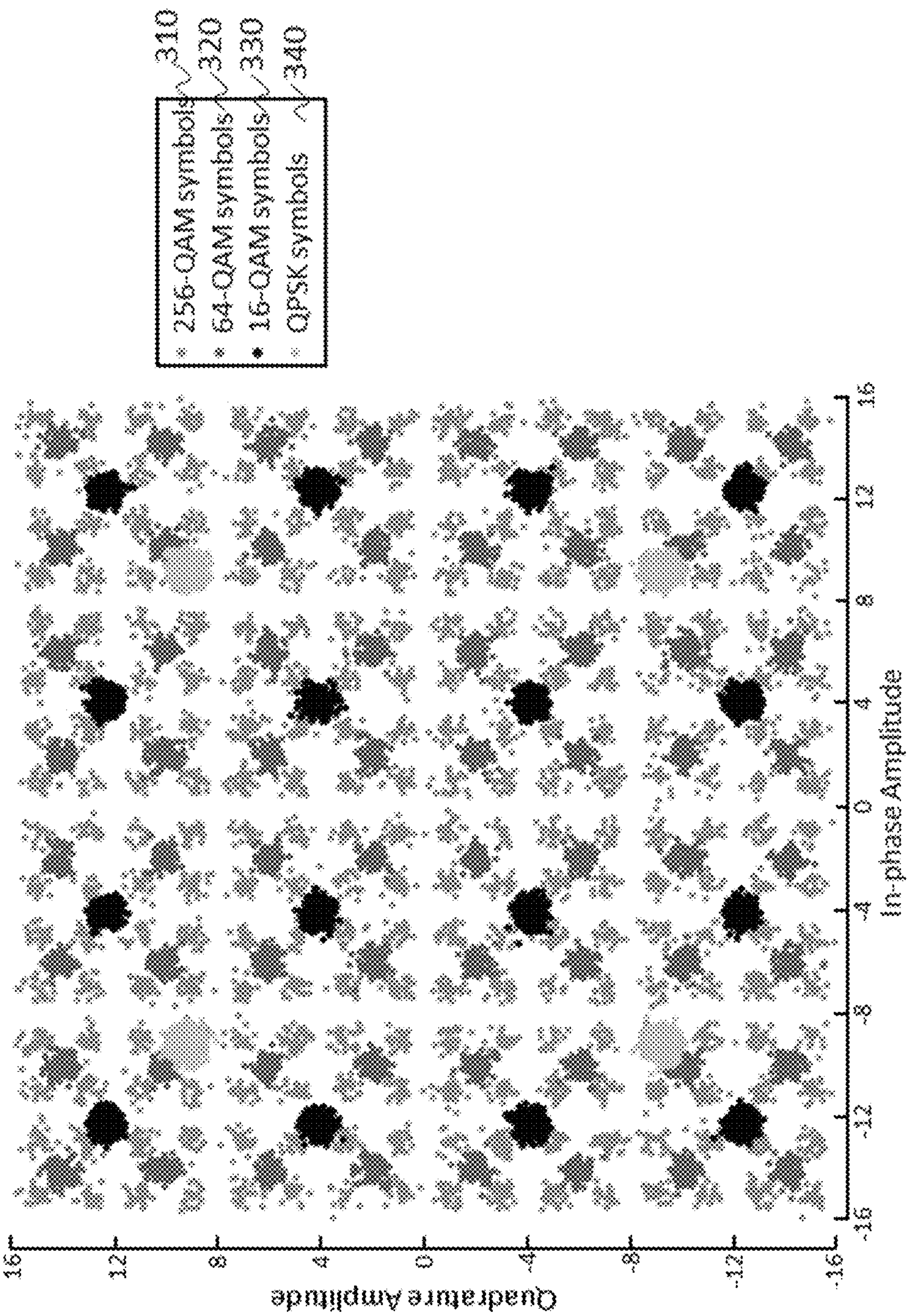
FIG. 3 is a diagram illustrating features as described herein.

In a first method for construction of the special detection constellation grid, for a given MCS table, choose M as the maximum possible MO, $MO_{max}$, for that particular MCS table. For example, M is 256 corresponding to 256-QAM when MCS table 2 is used. Referring now to FIG. 3, illustrated is an example constellation grid for identification of QPSK, 16-QAM, 64-QAM, and 256-QAM. In this example, the grid size is chosen to be 31×31 points. This way, the grid can be normalized to exactly cover all the 256-QAM symbols and all the half-distance points between these symbols. The x-axis of the grid shows quadrature amplitude, while the y-axis of the grid shows in-phase amplitude. The 256-QAM symbols are in yellow, and make up the smallest and most frequent clusters in the constellation grid. An example is at 310. The 64-QAM symbols are in blue, and make up the second most frequent clusters in the constellation grid. An example is at 320; the clusters in the same column are also clusters of 64-QAM symbols. The 16-QAM symbols are in red, and make up the third most frequent clusters in the constellation grid. An example is at 330; the clusters in the same column are also clusters of 16-QAM symbols. The QPSK symbols are in green, and make up the largest and least frequent clusters in the constellation grid. An example is at 340. The uniform circles, in red, may represent complex numbers of the custom grid.

In a second method for construction of the special detection constellation grid, for a given MCS Table, choose M to be the next lower MO than the maximum MO for that particular table, i.e., $M=MO_{max}-1$. For example, M is 64 corresponding to 64-QAM when MCS table 2 is used. The second method involves choosing one less than the highest MO. Points halfway between the received signals may be equalized, and may fall somewhere on the constellation grid (a nearest point may be selected).

Figure 4:
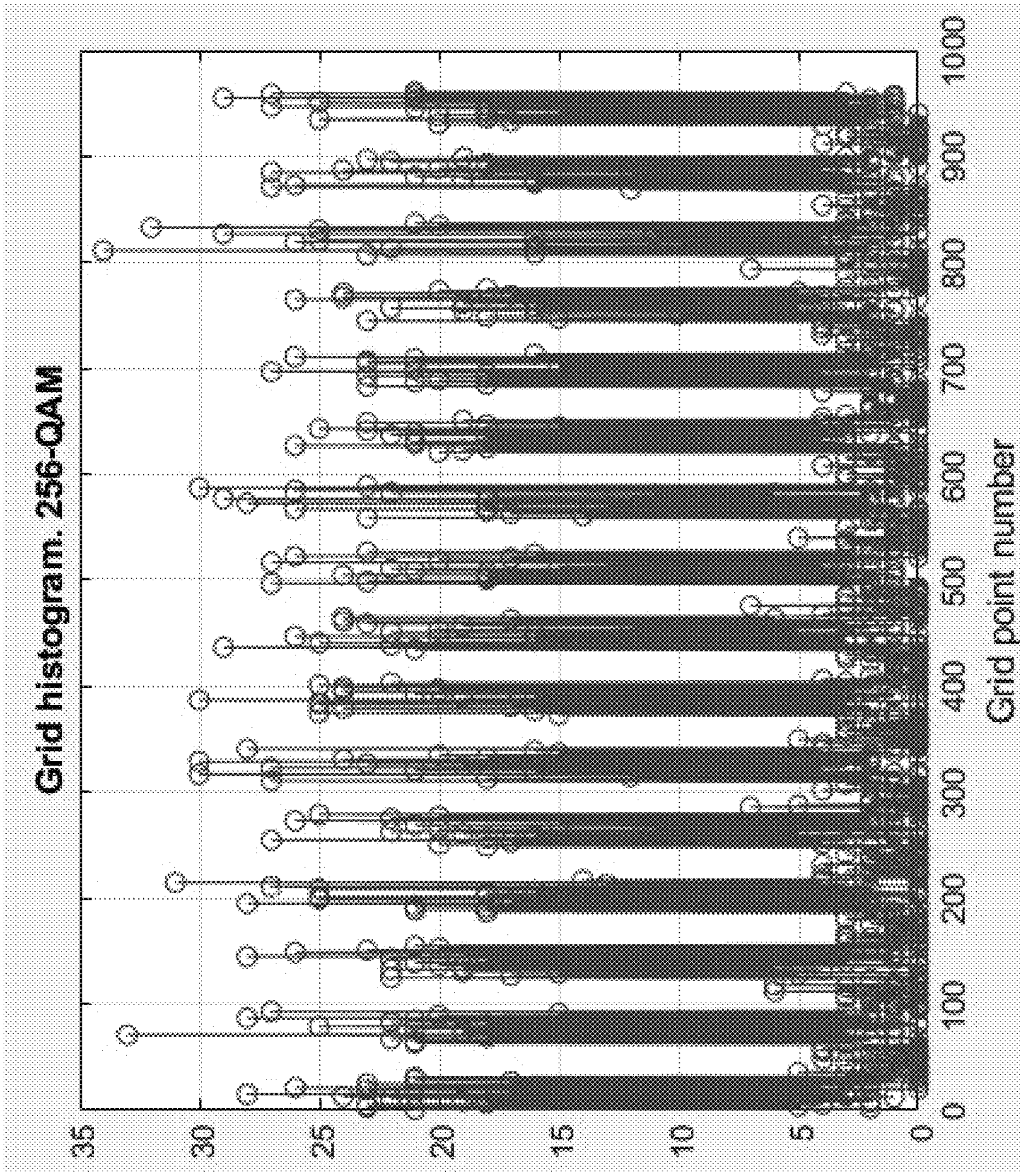
FIG. 4 is a diagram illustrating features as described herein.
Figure 5:
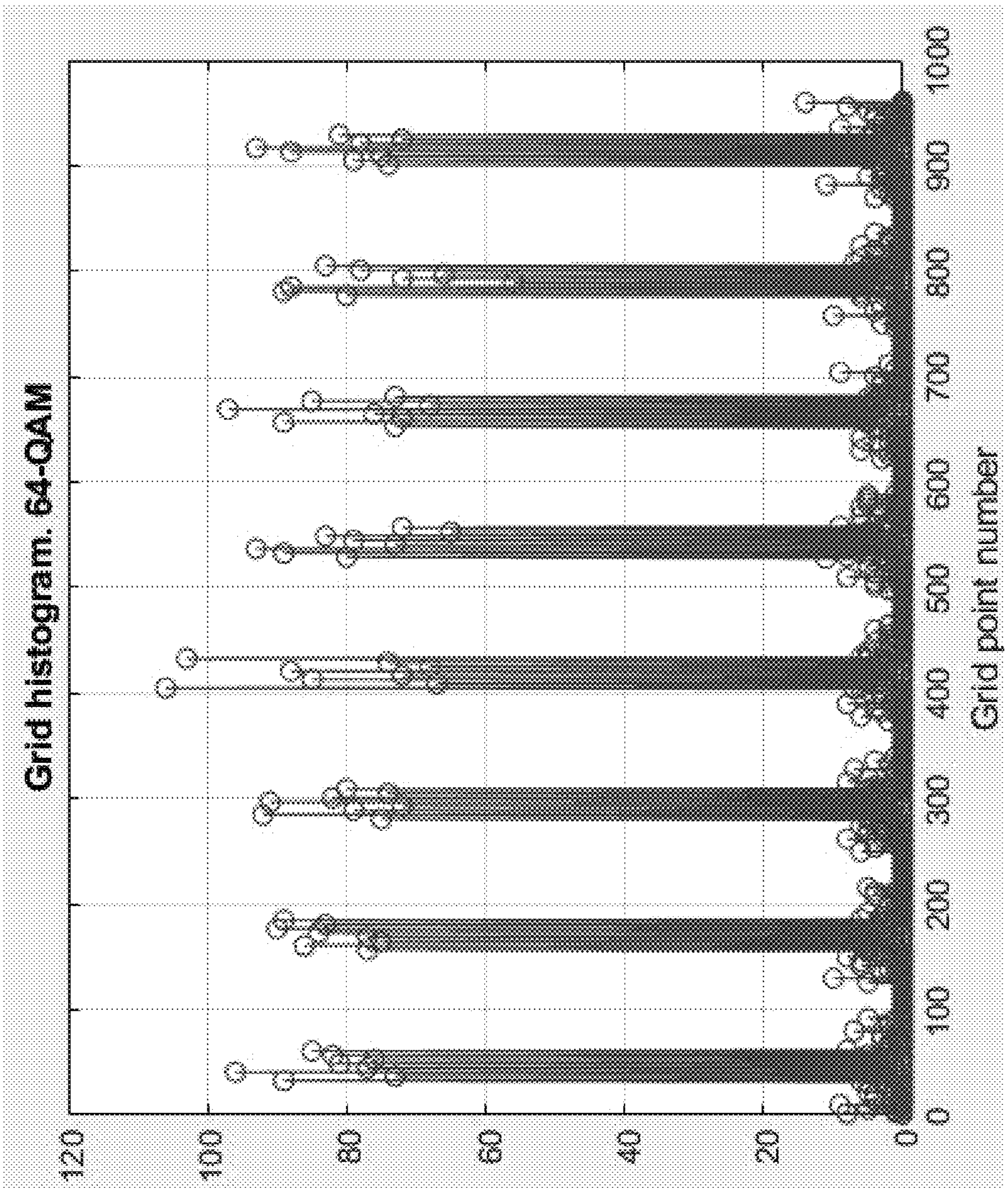
FIG. 5 is a diagram illustrating features as described herein.
Figure 6:
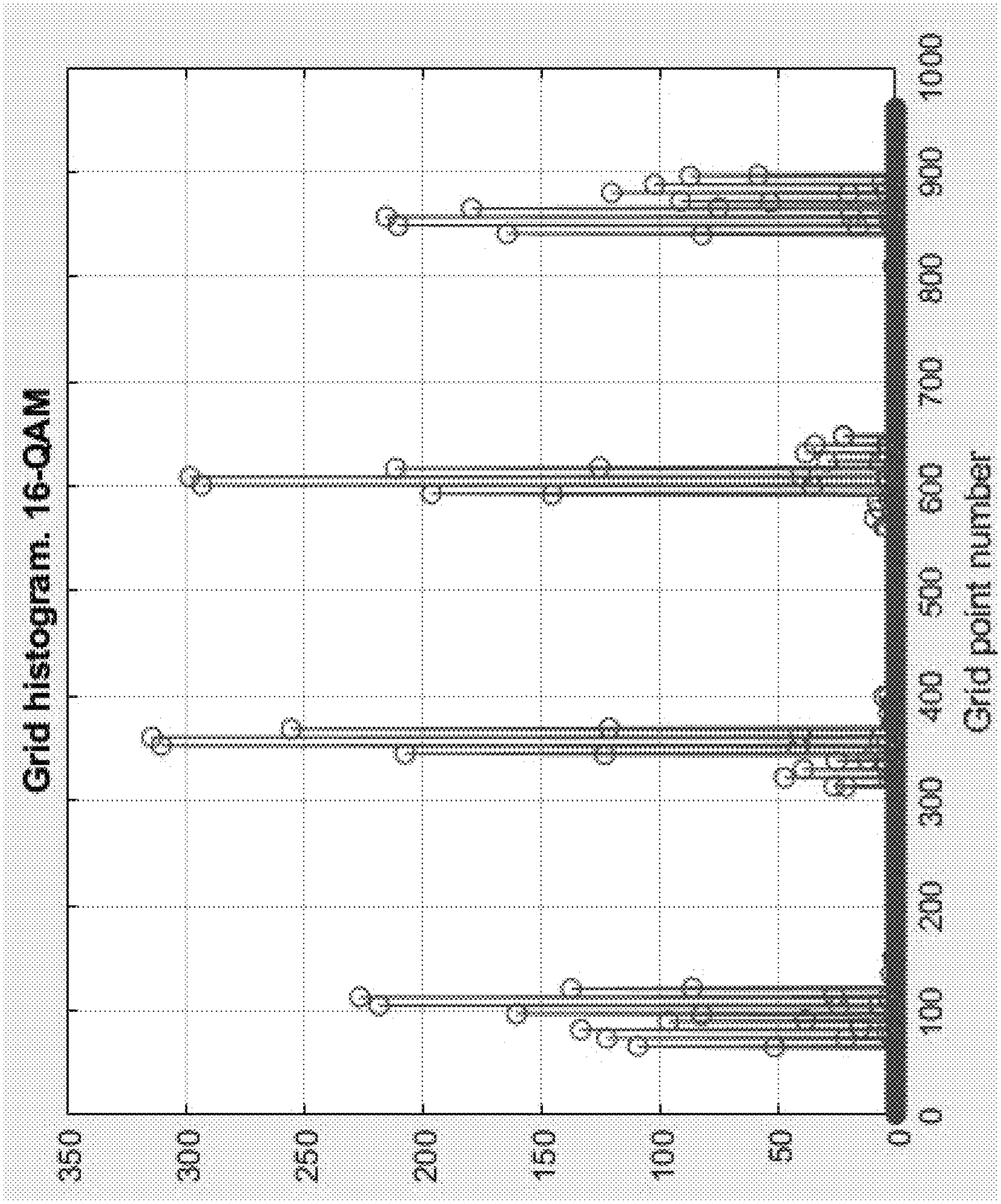
FIG. 6 is a diagram illustrating features as described herein.
Figure 7:
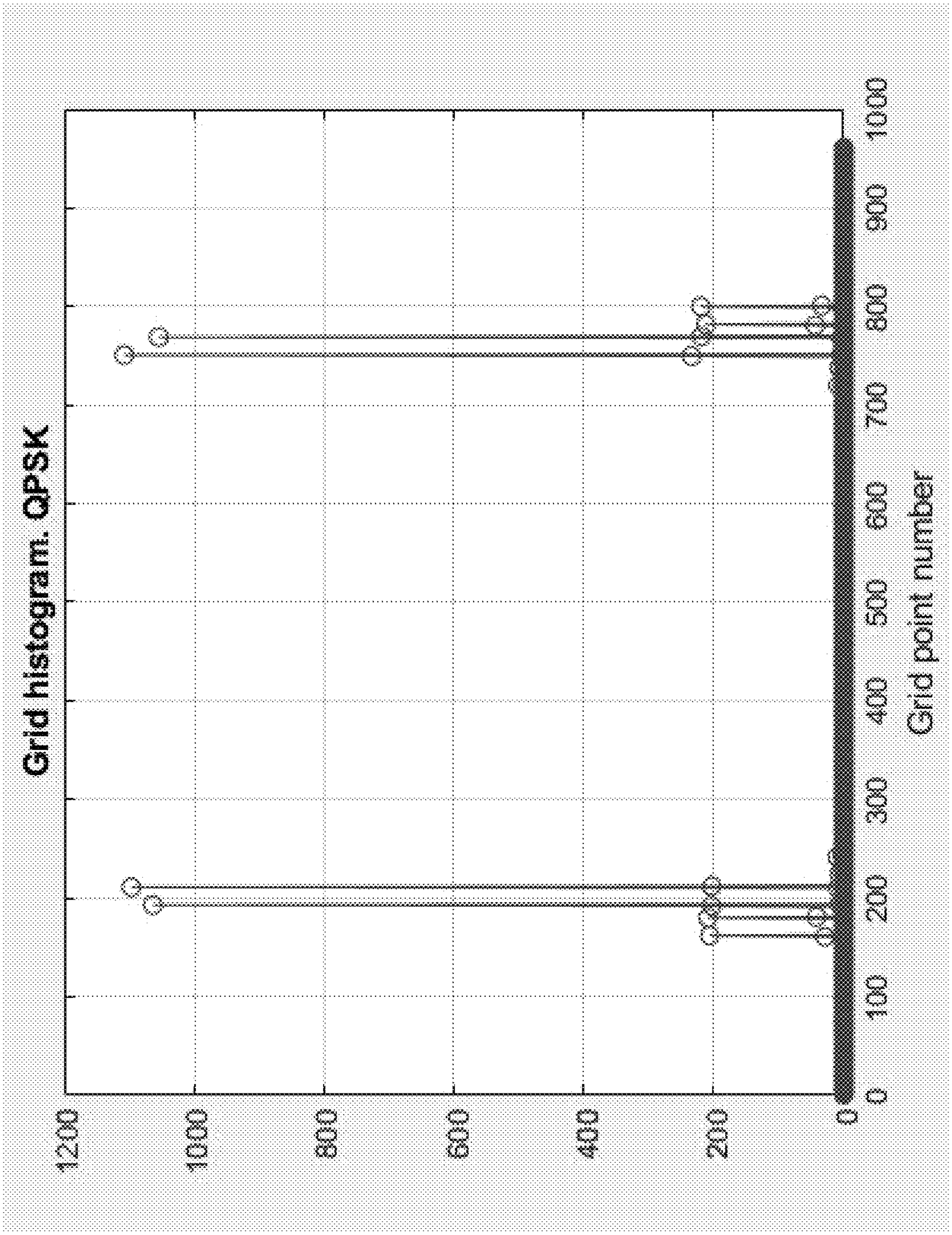
FIG. 7 is a diagram illustrating features as described herein.

In an example embodiment, the UE may perform modulation scheme fingerprint identification. When using the first method for construction of the special detection constellation grid, a histogram may be created representing the mapping of the received I/Q data points to the grid point with the shortest distance. A technical effect may be to be able to reliably classify the modulation order. Referring now to FIGS. 4-7, illustrated are histogram fingerprints for the method 1 constellation detection grid with the received I/Q data representing 256-QAM, 64-QAM, 16-QAM and QPSK respectively. Each histogram may be determined based on an entire MU-MIMO slot. FIG. 4 illustrates a grid histogram for 256-QAM. FIG. 5 illustrates a grid histogram for 64-QAM. FIG. 6 illustrates a grid histogram for 16-QAM. FIG. 7 illustrates a grid histogram for QPSK.

After correlating the constellation grid histogram of the received symbols with the reference histogram for each of the candidate modulation schemes, the modulation order of a co-UE may be detected, corresponding to the candidate modulation scheme resulting in the highest correlation value.

A UE may monitor zero power REs (e.g. 13 REs) and map them to the constellation grid. The UE may perform slicing and then correlate with each of the MO's fingerprints. The fingerprint with highest correlation may be chosen to be the most likely MO.

When using the second method for construction of the special detection constellation grid, all the MO up to M have a fingerprint similar to method 1, whereas the maximum MO has a fingerprint which is uniform over the entire grid. Hence, the constellation fingerprint for $MO_{max}$ resembles white noise. With method 2 the performance may be slightly reduced, but the custom grid is much smaller as compared to method 1 and hence the computational load is also reduced.

Figure 8:
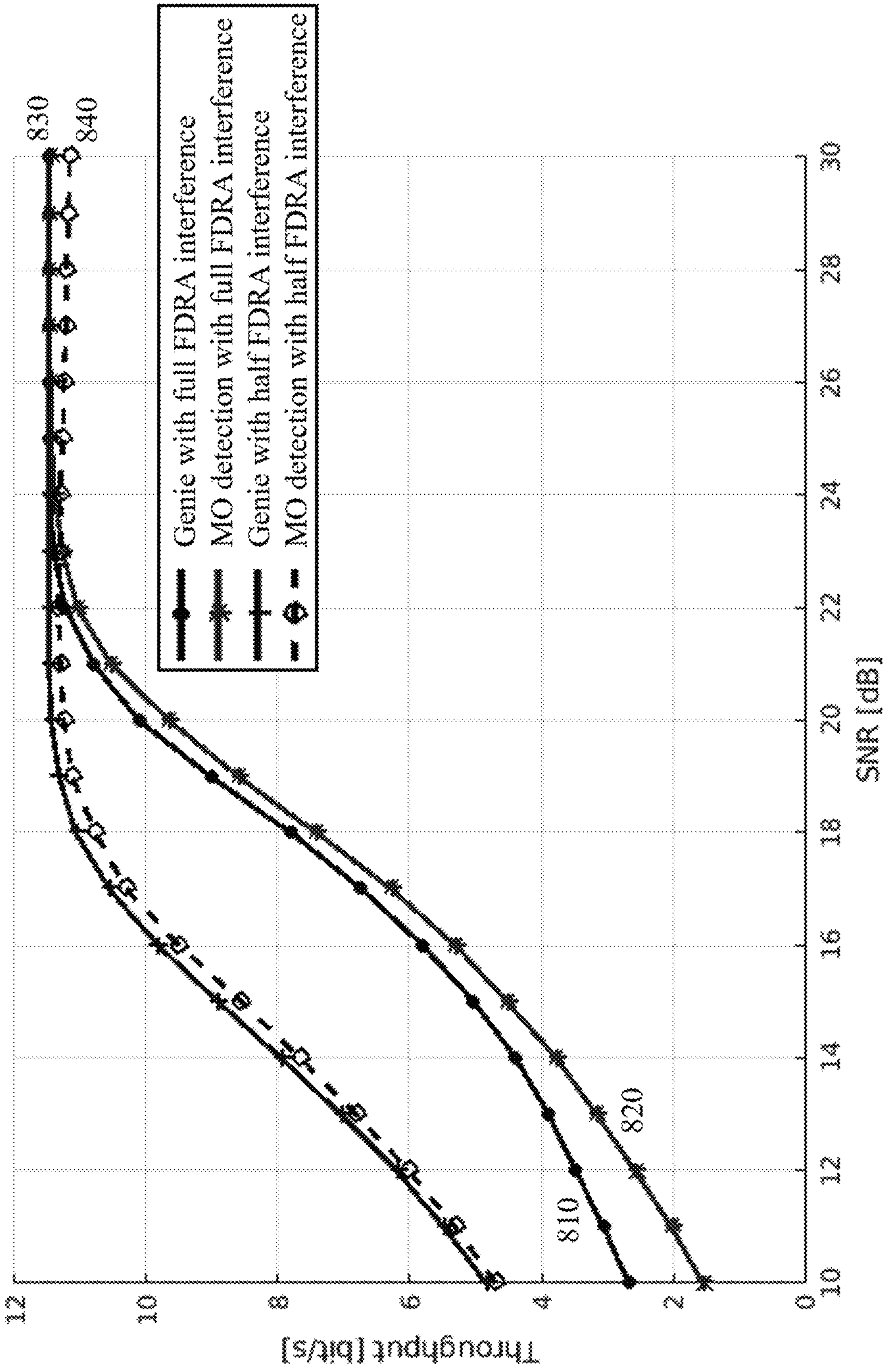
FIG. 8 is a diagram illustrating features as described herein.

Referring now to FIG. 8, illustrated is a graph illustrating throughput performance of aided MO detection according to example embodiments of the present disclosure. In the example of FIG. 8, the following configuration is used: single port, density 0.5, ZP-CSI-RS spanning the entire channel bandwidth of a target UE with 52 PRBs and SCS=15 kHz. This configuration results in 26 REs to evaluate when the interference is present over the entire target UE FDRA, and 13 REs when the interference is present only over half the FDRA. Genic interference FDRA information is assumed, but the DMRS ports are blindly detected along with the MO, which is blindly detected based on ZP-CSI-RS. 810 shows Genie with full FDRA interference. 820 shows MO detection with full FDRA interference. 830 shows Genie with half FDRA interference. 840 shows MO detection with half FRDA interference.

A technical effect of example embodiments of the present disclosure may be to enable reliable MO detection with a very minor loss in performance.

Figure 9:
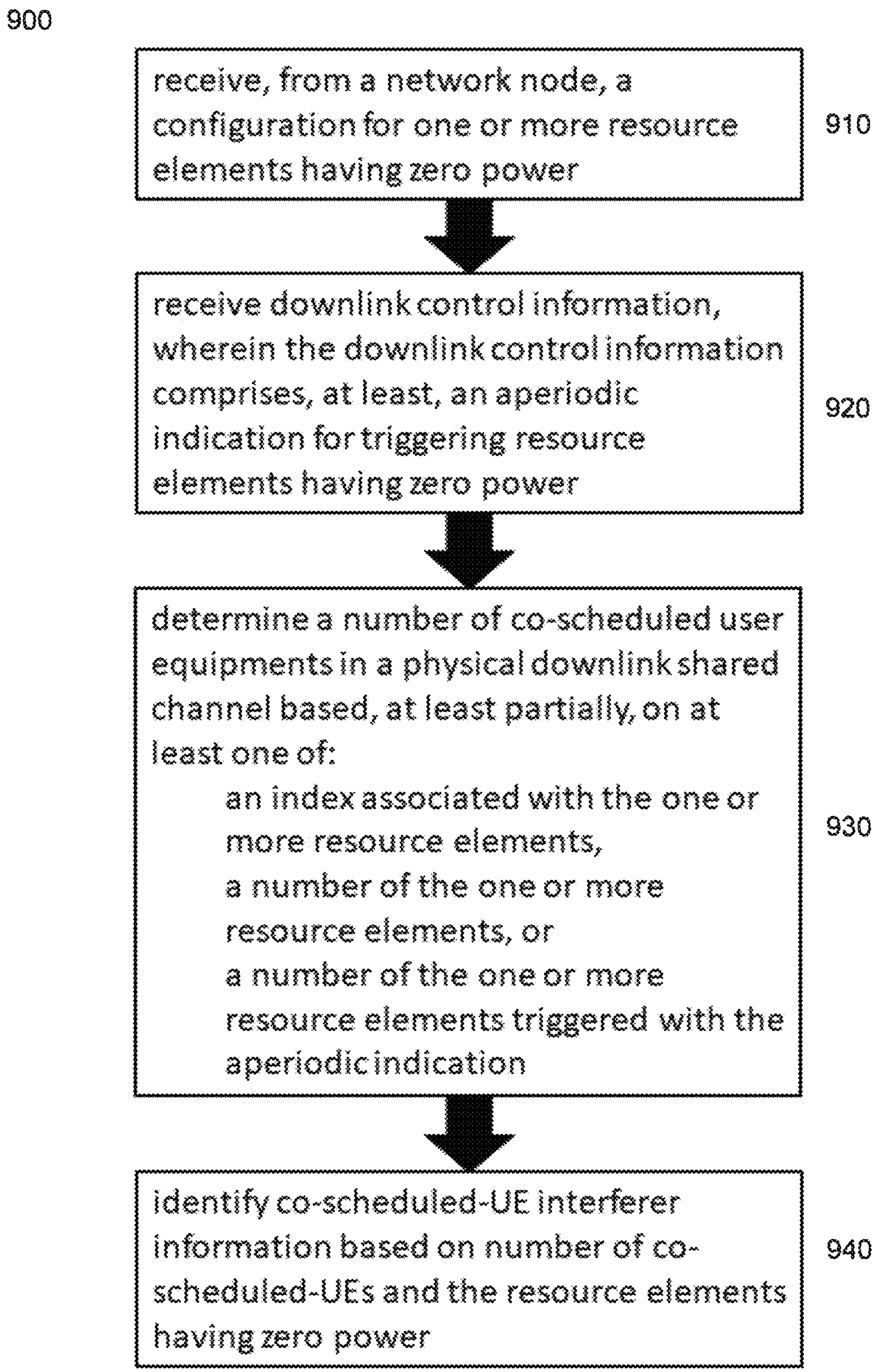
FIG. 9 is a flowchart illustrating steps as described herein.

FIG. 9 illustrates the potential steps of an example method 900. The example method 900 may include: receiving, from a network node, a configuration for one or more resource elements having zero power, 910; receiving downlink control information, wherein the downlink control information comprises, at least, an aperiodic indication for triggering resource elements having zero power, 920; and determining a number of co-scheduled user equipments in a physical downlink shared channel based, at least partially, on at least one of: an index associated with the one or more resource elements, a number of the one or more resource elements, or a number of the one or more resource elements triggered with the aperiodic indication, 930; and, optionally, identifying co-scheduled-UE interferer information based on number of co-scheduled-UEs and the resource elements having zero power. The co-scheduled-UE interferer information may include determination of the MO, FDRA and DMRS ports of each co-scheduled UE. The example method 900 may be performed, for example, with a UE or a target UE.

Figure 10:
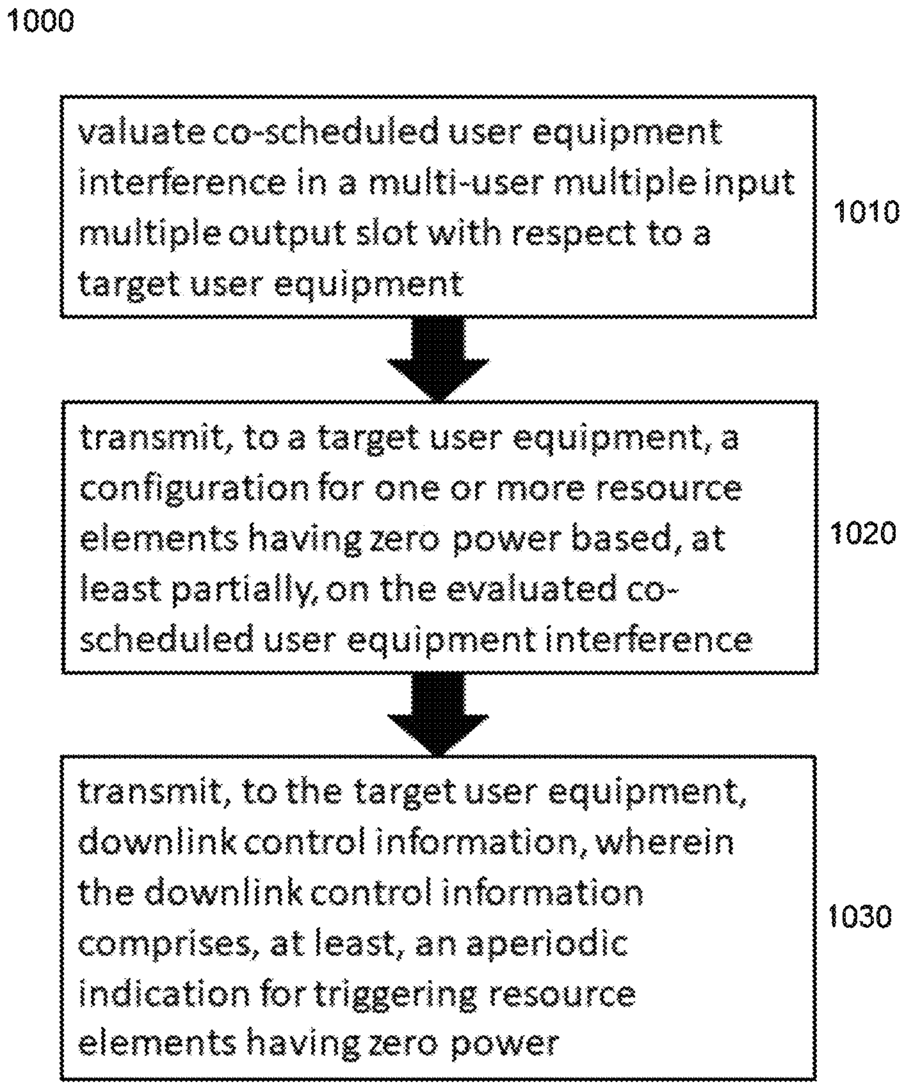
FIG. 10 is a flowchart illustrating steps as described herein.

FIG. 10 illustrates the potential steps of an example method 1000. The example method 1000 may include: evaluating co-scheduled user equipment interference in a multi-user multiple input multiple output slot with respect to a target user equipment, 1010; transmitting, to a target user equipment, a configuration for one or more resource elements having zero power based, at least partially, on the evaluated co-scheduled user equipment interference, 1020; and transmitting, to the target user equipment, downlink control information, wherein the downlink control information comprises, at least, an aperiodic indication for triggering resource elements having zero power, 1030. The example method 1000 may be performed, for example, with a network node, base station, eNB, gNB, etc.

In accordance with one example embodiment, an apparatus may comprise: at least one processor; and at least one memory storing instructions that, when executed by the at least one processor, cause the apparatus at least to: receive, from a network node, a configuration for one or more resource elements having zero power; receive downlink control information, wherein the downlink control information may comprise, at least, an aperiodic indication for triggering resource elements having zero power; and determine a number of co-scheduled user equipments in a physical downlink shared channel based, at least partially, on at least one of: an index associated with the one or more resource elements, a number of the one or more resource elements, or a number of the one or more resource elements triggered with the aperiodic indication.

The one or more resource elements may comprise a set of resource elements that belong together, and the set of resource elements may be configured to be triggered with a single trigger.

The aperiodic indication may be further configured to indicate the number of co-scheduled user equipments in the physical downlink shared channel.

The example apparatus may be further configured to: determine that the number of co-scheduled user equipments comprises two co-scheduled user equipments; detect at least one frequency domain resource allocation for the two co-scheduled user equipments; detect at least one demodulation reference signal port for the two co-scheduled user equipments; determine a first frequency domain resource allocation for a first co-scheduled user equipment of the two co-scheduled user equipments based, at least partially, on the at least one detected frequency domain resource allocation and the number of co-scheduled user equipments; determine a first demodulation reference signal port for the first co-scheduled user equipment based, at least partially, on the at least one detected demodulation reference signal port and the number of co-scheduled user equipments; determine a second frequency domain resource allocation for a second co-scheduled user equipment of the two co-scheduled user equipments based, at least partially, on the at least one detected frequency domain resource allocation and the number of co-scheduled user equipments; and determine a second demodulation reference signal port for the second co-scheduled user equipment based, at least partially, on the at least one detected demodulation reference signal port and the number of co-scheduled user equipments.

The example apparatus may be further configured to: determine a frequency domain resource allocation for a first co-scheduled user equipment of the co-scheduled user equipments; determine a demodulation reference signal port for the first co-scheduled user equipment; obtain channel estimates for the one or more demodulation reference signal ports; equalize the one or more resource elements having zero power on the frequency domain resource allocation for the demodulation reference signal port of the co-scheduled user equipment; construct a custom constellation grid for a possible modulation order for the first co-scheduled user equipment; slice the one or more equalized resource elements based, at least partially, on the custom constellation grid; and determine a modulation order for the first co-scheduled user equipment based, at least partially, on a comparison of one or more predetermined modulation order fingerprints with the one or more sliced and equalized resource elements.

The custom constellation grid may be constructed for a maximum modulation order possible for the first co-scheduled user equipment.

The custom constellation grid may be constructed for a modulation order below a maximum modulation order possible for the first co-scheduled user equipment.

Determining the modulation order for the first co-scheduled user equipment may comprise the example apparatus being further configured to: correlate a histogram of the custom constellation grid with reference histograms for one or more possible modulation orders for the first co-scheduled user equipment; and determine a modulation order associated with a reference histogram with a highest correlation value as the modulation order for the first co-scheduled user equipment.

The example apparatus may be further configured to: determine that the number of co-scheduled user equipments in the physical downlink shared channel is zero in response to the number of the one or more resource elements triggered with the aperiodic indication being zero.

In accordance with one aspect, an example method may be provided comprising: receiving, with a user equipment from a network node, a configuration for one or more resource elements having zero power; receiving downlink control information, wherein the downlink control information may comprise, at least, an aperiodic indication for triggering resource elements having zero power; and determining a number of co-scheduled user equipments in a physical downlink shared channel based, at least partially, on at least one of: an index associated with the one or more resource elements, a number of the one or more resource elements, or a number of the one or more resource elements triggered with the aperiodic indication.

The one or more resource elements may comprise a set of resource elements that belong together, and the set of resource elements may be configured to be triggered with a single trigger.

The aperiodic indication may be further configured to indicate the number of co-scheduled user equipments in the physical downlink shared channel.

The example method may further comprise: determining that the number of co-scheduled user equipments comprises two co-scheduled user equipments; detecting at least one frequency domain resource allocation for the two co-scheduled user equipments; detecting at least one demodulation reference signal port for the two co-scheduled user equipments; determining a first frequency domain resource allocation for a first co-scheduled user equipment of the two co-scheduled user equipments based, at least partially, on the at least one detected frequency domain resource allocation and the number of co-scheduled user equipments; determining a first demodulation reference signal port for the first co-scheduled user equipment based, at least partially, on the at least one detected demodulation reference signal port and the number of co-scheduled user equipments; determining a second frequency domain resource allocation for a second co-scheduled user equipment of the two co-scheduled user equipments based, at least partially, on the at least one detected frequency domain resource allocation and the number of co-scheduled user equipments; and determining a second demodulation reference signal port for the second co-scheduled user equipment based, at least partially, on the at least one detected demodulation reference signal port and the number of co-scheduled user equipments.

The example method may further comprise: determining a frequency domain resource allocation for a first co-scheduled user equipment of the co-scheduled user equipments; determining a demodulation reference signal port for the first co-scheduled user equipment; obtaining channel estimates for the one or more demodulation reference signal ports; equalizing the one or more resource elements having zero power on the frequency domain resource allocation for the demodulation reference signal port of the co-scheduled user equipment; constructing a custom constellation grid for a possible modulation order for the first co-scheduled user equipment; slicing the one or more equalized resource elements based, at least partially, on the custom constellation grid; and determining a modulation order for the first co-scheduled user equipment based, at least partially, on a comparison of one or more predetermined modulation order fingerprints with the one or more sliced and equalized resource elements.

The custom constellation grid may be constructed for a maximum modulation order possible for the first co-scheduled user equipment.

The custom constellation grid may be constructed for a modulation order below a maximum modulation order possible for the first co-scheduled user equipment.

The determining of the modulation order for the first co-scheduled user equipment may comprise: correlating a histogram of the custom constellation grid with reference histograms for one or more possible modulation orders for the first co-scheduled user equipment; and determining a modulation order associated with a reference histogram with a highest correlation value as the modulation order for the first co-scheduled user equipment.

The example method may further comprise: determining that the number of co-scheduled user equipments in the physical downlink shared channel is zero in response to the number of the one or more resource elements triggered with the aperiodic indication being zero.

In accordance with one example embodiment, an apparatus may comprise: circuitry configured to perform: receiving, from a network node, a configuration for one or more resource elements having zero power; circuitry configured to perform: receiving downlink control information, wherein the downlink control information may comprise, at least, an aperiodic indication for triggering resource elements having zero power; and circuitry configured to perform: determining a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one example embodiment, an apparatus may comprise: processing circuitry; memory circuitry including computer program code, the memory circuitry and the computer program code configured to, with the processing circuitry, enable the apparatus to: receive, from a network node, a configuration for one or more resource elements having zero power; receive downlink control information, wherein the downlink control information may comprise, at least, an aperiodic indication for triggering resource elements having zero power; and determine a number of co-scheduled user equipments in a physical downlink shared channel based, at least partially, on at least one of: an index associated with the one or more resource elements, a number of the one or more resource elements, or a number of the one or more resource elements triggered with the aperiodic indication.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for: receiving, from a network node, a configuration for one or more resource elements having zero power; receiving downlink control information, wherein the downlink control information may comprise, at least, an aperiodic indication for triggering resource elements having zero power; and determining a number of co-scheduled user equipments in a physical downlink shared channel based, at least partially, on at least one of: an index associated with the one or more resource elements, a number of the one or more resource elements, or a number of the one or more resource elements triggered with the aperiodic indication.

The one or more resource elements may comprise a set of resource elements that belong together, and the set of resource elements may be configured to be triggered with a single trigger.

The aperiodic indication may be further configured to indicate the number of co-scheduled user equipments in the physical downlink shared channel.

The means may be further configured for: determining that the number of co-scheduled user equipments comprises two co-scheduled user equipments; detecting at least one frequency domain resource allocation for the two co-scheduled user equipments; detecting at least one demodulation reference signal port for the two co-scheduled user equipments; determining a first frequency domain resource allocation for a first co-scheduled user equipment of the two co-scheduled user equipments based, at least partially, on the at least one detected frequency domain resource allocation and the number of co-scheduled user equipments; determining a first demodulation reference signal port for the first co-scheduled user equipment based, at least partially, on the at least one detected demodulation reference signal port and the number of co-scheduled user equipments; determining a second frequency domain resource allocation for a second co-scheduled user equipment of the two co-scheduled user equipments based, at least partially, on the at least one detected frequency domain resource allocation and the number of co-scheduled user equipments; and determining a second demodulation reference signal port for the second co-scheduled user equipment based, at least partially, on the at least one detected demodulation reference signal port and the number of co-scheduled user equipments.

The means may be further configured for: determining a frequency domain resource allocation for a first co-scheduled user equipment of the co-scheduled user equipments; determining a demodulation reference signal port for the first co-scheduled user equipment; obtaining channel estimates for the one or more demodulation reference signal ports; equalizing the one or more resource elements having zero power on the frequency domain resource allocation for the demodulation reference signal port of the co-scheduled user equipment; constructing a custom constellation grid for a possible modulation order for the first co-scheduled user equipment; slicing the one or more equalized resource elements based, at least partially, on the custom constellation grid; and determining a modulation order for the first co-scheduled user equipment based, at least partially, on a comparison of one or more predetermined modulation order fingerprints with the one or more sliced and equalized resource elements.

The custom constellation grid may be constructed for a maximum modulation order possible for the first co-scheduled user equipment.

The custom constellation grid may be constructed for a modulation order below a maximum modulation order possible for the first co-scheduled user equipment.

The means configured for determining the modulation order for the first co-scheduled user equipment may comprise means configured for: correlating a histogram of the custom constellation grid with reference histograms for one or more possible modulation orders for the first co-scheduled user equipment; and determining a modulation order associated with a reference histogram with a highest correlation value as the modulation order for the first co-scheduled user equipment.

The means may be further configured for: determining that the number of co-scheduled user equipments in the physical downlink shared channel is zero in response to the number of the one or more resource elements triggered with the aperiodic indication being zero.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving, from a network node, of a configuration for one or more resource elements having zero power; cause receiving of downlink control information, wherein the downlink control information may comprise, at least, an aperiodic indication for triggering resource elements having zero power; and cause determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one example embodiment, a non-transitory computer-readable medium comprising program instructions stored thereon for performing at least the following: causing receiving, from a network node, of a configuration for one or more resource elements having zero power; causing receiving of downlink control information, wherein the downlink control information may comprise, at least, an aperiodic indication for triggering resource elements having zero power; and causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with another example embodiment, a non-transitory program storage device readable by a machine may be provided, tangibly embodying instructions executable by the machine for performing operations, the operations comprising: causing receiving, from a network node, of a configuration for one or more resource elements having zero power; causing receiving of downlink control information, wherein the downlink control information may comprise, at least, an aperiodic indication for triggering resource elements having zero power; and causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with another example embodiment, a non-transitory computer-readable medium comprising instructions that, when executed by an apparatus, cause the apparatus to perform at least the following: causing receiving, from a network node, of a configuration for one or more resource elements having zero power; causing receiving of downlink control information, wherein the downlink control information may comprise, at least, an aperiodic indication for triggering resource elements having zero power; and causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

A computer implemented system comprising: at least one processor and at least one non-transitory memory storing instructions that, when executed by the at least one processor, cause the system at least to perform: causing receiving, from a network node, of a configuration for one or more resource elements having zero power; causing receiving of downlink control information, wherein the downlink control information may comprise, at least, an aperiodic indication for triggering resource elements having zero power; and causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

A computer implemented system comprising: means for causing receiving, from a network node, of a configuration for one or more resource elements having zero power; means for causing receiving of downlink control information, wherein the downlink control information may comprise, at least, an aperiodic indication for triggering resource elements having zero power; and means for causing determining of a number of co-scheduled user equipments in a physical downlink shared channel based, at least partially, on at least one of: an index associated with the one or more resource elements, a number of the one or more resource elements, or a number of the one or more resource elements triggered with the aperiodic indication.

In accordance with one example embodiment, an apparatus may comprise: at least one processor; and at least one memory storing instructions that, when executed by the at least one processor, cause the apparatus at least to: evaluate co-scheduled user equipment interference in a multi-user multiple input multiple output slot with respect to a target user equipment; transmit, to a target user equipment, a configuration for one or more resource elements having zero power based, at least partially, on the evaluated co-scheduled user equipment interference; and transmit, to the target user equipment, downlink control information, wherein the downlink control information may comprise, at least, an aperiodic indication for triggering resource elements having zero power.

The one or more resource elements may comprise a set of resource elements that belong together, and the set of resource elements may be configured to be triggered with a single trigger.

The aperiodic indication may be further configured to indicate a number of co-scheduled user equipments in a physical downlink shared channel.

A number of the one or more resource elements having zero power may be one in response to a single co-scheduled user equipment being present in the multi-user multiple input multiple output slot with respect to the target user equipment.

A number of the one or more resource elements having zero power may be two in response to two co-scheduled user equipments being present in the multi-user multiple input multiple output slot with respect to the target user equipment.

A number of the one or more resource elements triggered with the aperiodic indication may be zero in response to no co-scheduled user equipment being present in the multi-user multiple input multiple output slot with respect to the target user equipment.

A number of the one or more resource elements triggered with the aperiodic indication may be one in response to one co-scheduled user equipment being present in the multi-user multiple input multiple output slot with respect to the target user equipment.

A number of the one or more resource elements triggered with the aperiodic indication may be two in response to two co-scheduled user equipments being present in the multi-user multiple input multiple output slot with respect to the target user equipment.

In accordance with one aspect, an example method may be provided comprising: evaluating, with a network node, co-scheduled user equipment interference in a multi-user multiple input multiple output slot with respect to a target user equipment; transmitting, to a target user equipment, a configuration for one or more resource elements having zero power based, at least partially, on the evaluated co-scheduled user equipment interference; and transmitting, to the target user equipment, downlink control information, wherein the downlink control information may comprise, at least, an aperiodic indication for triggering resource elements having zero power.

The one or more resource elements may comprise a set of resource elements that belong together, and the set of resource elements may be configured to be triggered with a single trigger.

The aperiodic indication may be further configured to indicate a number of co-scheduled user equipments in a physical downlink shared channel.

A number of the one or more resource elements having zero power may be one in response to a single co-scheduled user equipment being present in the multi-user multiple input multiple output slot with respect to the target user equipment.

A number of the one or more resource elements having zero power may be two in response to two co-scheduled user equipments being present in the multi-user multiple input multiple output slot with respect to the target user equipment.

A number of the one or more resource elements triggered with the aperiodic indication may be zero in response to no co-scheduled user equipment being present in the multi-user multiple input multiple output slot with respect to the target user equipment.

A number of the one or more resource elements triggered with the aperiodic indication may be one in response to one co-scheduled user equipment being present in the multi-user multiple input multiple output slot with respect to the target user equipment.

A number of the one or more resource elements triggered with the aperiodic indication may be two in response to two co-scheduled user equipments being present in the multi-user multiple input multiple output slot with respect to the target user equipment.

In accordance with one example embodiment, an apparatus may comprise: circuitry configured to perform: evaluating co-scheduled user equipment interference in a multi-user multiple input multiple output slot with respect to a target user equipment; circuitry configured to perform: transmitting, to a target user equipment, a configuration for one or more resource elements having zero power based, at least partially, on the evaluated co-scheduled user equipment interference; and circuitry configured to perform: transmitting, to the target user equipment, downlink control information, wherein the downlink control information may comprise, at least, an aperiodic indication for triggering resource elements having zero power.

In accordance with one example embodiment, an apparatus may comprise: processing circuitry; memory circuitry including computer program code, the memory circuitry and the computer program code configured to, with the processing circuitry, enable the apparatus to: evaluate co-scheduled user equipment interference in a multi-user multiple input multiple output slot with respect to a target user equipment; transmit, to a target user equipment, a configuration for one or more resource elements having zero power based, at least partially, on the evaluated co-scheduled user equipment interference; and transmit, to the target user equipment, downlink control information, wherein the downlink control information may comprise, at least, an aperiodic indication for triggering resource elements having zero power.

In accordance with one example embodiment, an apparatus may comprise means for: evaluating co-scheduled user equipment interference in a multi-user multiple input multiple output slot with respect to a target user equipment; transmitting, to a target user equipment, a configuration for one or more resource elements having zero power based, at least partially, on the evaluated co-scheduled user equipment interference; and transmitting, to the target user equipment, downlink control information, wherein the downlink control information may comprise, at least, an aperiodic indication for triggering resource elements having zero power.

The one or more resource elements may comprise a set of resource elements that belong together, and the set of resource elements may be configured to be triggered with a single trigger.

The aperiodic indication may be further configured to indicate a number of co-scheduled user equipments in a physical downlink shared channel.

A number of the one or more resource elements having zero power may be one in response to a single co-scheduled user equipment being present in the multi-user multiple input multiple output slot with respect to the target user equipment.

A number of the one or more resource elements having zero power may be two in response to two co-scheduled user equipments being present in the multi-user multiple input multiple output slot with respect to the target user equipment.

A number of the one or more resource elements triggered with the aperiodic indication may be zero in response to no co-scheduled user equipment being present in the multi-user multiple input multiple output slot with respect to the target user equipment.

A number of the one or more resource elements triggered with the aperiodic indication may be one in response to one co-scheduled user equipment being present in the multi-user multiple input multiple output slot with respect to the target user equipment.

A number of the one or more resource elements triggered with the aperiodic indication may be two in response to two co-scheduled user equipments being present in the multi-user multiple input multiple output slot with respect to the target user equipment.

In accordance with one example embodiment, a non-transitory computer-readable medium comprising instructions stored thereon which, when executed with at least one processor, cause the at least one processor to: evaluate co-scheduled user equipment interference in a multi-user multiple input multiple output slot with respect to a target user equipment; cause transmitting, to a target user equipment, of a configuration for one or more resource elements having zero power based, at least partially, on the evaluated co-scheduled user equipment interference; and cause transmitting, to the target user equipment, of downlink control information, wherein the downlink control information may comprise, at least, an aperiodic indication for triggering resource elements having zero power.

In accordance with one example embodiment, a non-transitory computer-readable medium comprising program instructions stored thereon for performing at least the following: evaluating co-scheduled user equipment interference in a multi-user multiple input multiple output slot with respect to a target user equipment; causing transmitting, to a target user equipment, of a configuration for one or more resource elements having zero power based, at least partially, on the evaluated co-scheduled user equipment interference; and causing transmitting, to the target user equipment, of downlink control information, wherein the downlink control information may comprise, at least, an aperiodic indication for triggering resource elements having zero power.

In accordance with another example embodiment, a non-transitory program storage device readable by a machine may be provided, tangibly embodying instructions executable by the machine for performing operations, the operations comprising: evaluating co-scheduled user equipment interference in a multi-user multiple input multiple output slot with respect to a target user equipment; causing transmitting, to a target user equipment, of a configuration for one or more resource elements having zero power based, at least partially, on the evaluated co-scheduled user equipment interference; and causing transmitting, to the target user equipment, of downlink control information, wherein the downlink control information may comprise, at least, an aperiodic indication for triggering resource elements having zero power.

In accordance with another example embodiment, a non-transitory computer-readable medium comprising instructions that, when executed by an apparatus, cause the apparatus to perform at least the following: evaluating co-scheduled user equipment interference in a multi-user multiple input multiple output slot with respect to a target user equipment; causing transmitting, to a target user equipment, of a configuration for one or more resource elements having zero power based, at least partially, on the evaluated co-scheduled user equipment interference; and causing transmitting, to the target user equipment, of downlink control information, wherein the downlink control information may comprise, at least, an aperiodic indication for triggering resource elements having zero power.

A computer implemented system comprising: at least one processor and at least one non-transitory memory storing instructions that, when executed by the at least one processor, cause the system at least to perform: evaluating co-scheduled user equipment interference in a multi-user multiple input multiple output slot with respect to a target user equipment; causing transmitting, to a target user equipment, of a configuration for one or more resource elements having zero power based, at least partially, on the evaluated co-scheduled user equipment interference; and causing transmitting, to the target user equipment, of downlink control information, wherein the downlink control information may comprise, at least, an aperiodic indication for triggering resource elements having zero power.

A computer implemented system comprising: means for evaluating co-scheduled user equipment interference in a multi-user multiple input multiple output slot with respect to a target user equipment; means for causing transmitting, to a target user equipment, of a configuration for one or more resource elements having zero power based, at least partially, on the evaluated co-scheduled user equipment interference; and means for causing transmitting, to the target user equipment, of downlink control information, wherein the downlink control information may comprise, at least, an aperiodic indication for triggering resource elements having zero power.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
at least one processor; and
at least one non-transitory memory storing instructions that, when executed by the at least one processor, cause the apparatus at least to:
receive, from a network node, a configuration for one or more resource elements having zero power;
receive downlink control information, wherein the downlink control information comprises an aperiodic indication for triggering resource elements having zero power;
determine a number of co-scheduled user equipments in a physical downlink shared channel based on the following: an index associated with the one or more resource elements, a number of the one or more resource elements, and a number of the one or more resource elements triggered with the aperiodic indication;
determine that the number of co-scheduled user equipments comprises two co-scheduled user equipments;
for each of the two co-scheduled user equipments:
detect at least one frequency domain resource allocation for the co-scheduled user equipment;
detect at least one demodulation reference signal port for the co-scheduled user equipment;
determine a frequency domain resource allocation for the co-scheduled user equipment based on the at least one detected frequency domain resource allocation and the number of co-scheduled user equipments;
determine a demodulation reference signal port for the co-scheduled user equipment based on the at least one detected demodulation reference signal port and the number of co-scheduled user equipments;
obtain channel estimates for the demodulation reference signal port; equalize the one or more resource elements having zero power on the frequency domain resource allocation for the demodulation reference signal port;
construct a custom constellation grid for a possible modulation order for the co-scheduled user equipment;
slice the one or more equalized resource elements based on the custom constellation grid; and
determine a modulation order for the co-scheduled user equipment based on a comparison of one or more predetermined modulation order fingerprints with the one or more sliced and equalized resource elements.

2. The apparatus of claim 1, wherein the one or more resource elements comprise a set of resource elements that belong together, and wherein the set of resource elements is configured to be triggered with a single trigger.

3. The apparatus of claim 2, wherein the aperiodic indication is further configured to indicate the number of co-scheduled user equipments in the physical downlink shared channel.

4. The apparatus of claim 3, wherein the custom constellation grid is constructed for a maximum modulation order possible for the co-scheduled user equipment.

5. The apparatus of claim 3, wherein the custom constellation grid is constructed for a modulation order below a maximum modulation order possible for the co-scheduled user equipment.

6. The apparatus of claim 5, wherein determining the modulation order for the first co-scheduled user equipment comprises:
correlating a histogram of the custom constellation grid with reference histograms for one or more possible modulation orders for the co-scheduled user equipment; and
determining a modulation order associated with a reference histogram with a highest correlation value as the modulation order for the co-scheduled user equipment.

7. The apparatus of claim 6, wherein the at least one non-transitory memory stores further instructions that, when executed by the at least one processor, cause the apparatus to:
determine that the number of co-scheduled user equipments in the physical downlink shared channel is zero in response to the number of the one or more resource elements triggered with the aperiodic indication being zero.

8. A system comprising: an apparatus;
at least one processor; and
at least one non-transitory memory storing instructions that, when executed by the at least one processor, cause the apparatus at least to:
receive, from a network node, a configuration for one or more resource elements having zero power;
receive downlink control information, wherein the downlink control information comprises an aperiodic indication for triggering resource elements having zero power;
determine a number of co-scheduled user equipments in a physical downlink shared channel based on the following: an index associated with the one or more resource elements, a number of the one or more resource elements, and a number of the one or more resource elements triggered with the aperiodic indication;
determine that the number of co-scheduled user equipments comprises two co-scheduled user equipments;
for each of the two co-scheduled user equipments:
detect at least one frequency domain resource allocation for the co-scheduled user equipment;
detect at least one demodulation reference signal port for the co-scheduled user equipment;
determine a frequency domain resource allocation for the co-scheduled user equipment based on the at least one detected frequency domain resource allocation and the number of co-scheduled user equipments;
determine a demodulation reference signal port for the co-scheduled user equipment based on the at least one detected demodulation reference signal port and the number of co-scheduled user equipments;
obtain channel estimates for the demodulation reference signal port;
equalize the one or more resource elements having zero power on the frequency domain resource allocation for the demodulation reference signal port; construct a custom constellation grid for a possible modulation order for the co-scheduled user equipment;

slice the one or more equalized resource elements based on the custom constellation grid; and determine a modulation order for the co-scheduled user equipment based on a comparison of one or more predetermined modulation order fingerprints with the one or more sliced and equalized resource elements.

9. The system of claim 8, wherein the one or more resource elements comprise a set of resource elements that belong together, and wherein the set of resource elements is configured to be triggered with a single trigger.

10. The system of claim 9, wherein the aperiodic indication is further configured to indicate the number of co-scheduled user equipments in the physical downlink shared channel.

11. The system of claim 10, wherein the custom constellation grid is constructed for a maximum modulation order possible for the co-scheduled user equipment.

12. The system of claim 10, wherein the custom constellation grid is constructed for a modulation order below a maximum modulation order possible for the co-scheduled user equipment.

13. The system of claim 12, wherein determining the modulation order for the co-scheduled user equipment comprises:

correlating a histogram of the custom constellation grid with reference histograms for one or more possible modulation orders for the co-scheduled user equipment; and determining a modulation order associated with a reference histogram with a highest correlation value as the modulation order for the co-scheduled user equipment.

14. The system of claim 13, wherein the at least one non-transitory memory stores instructions that, when executed by the at least one processor, cause the apparatus to:

determine that the number of co-scheduled user equipments in the physical downlink shared channel is zero in response to the number of the one or more resource elements triggered with the aperiodic indication being zero.

15. A method comprising:

receiving, from a network node, a configuration for one or more resource elements having zero power;

receiving downlink control information, wherein the downlink control information comprises an aperiodic indication for triggering resource elements having zero power;

determining a number of co-scheduled user equipments in a physical downlink shared channel based on the following: an index associated with the one or more resource elements, a number of the one or more resource elements, and a number of the one or more resource elements triggered with the aperiodic indication;

determining that the number of co-scheduled user equipments comprises two co-scheduled user equipments;

for each of the two co-scheduled user equipments:

detecting at least one frequency domain resource allocation for the co-scheduled user equipment;

detecting at least one demodulation reference signal port for the co-scheduled user equipment;

determining a frequency domain resource allocation for the co-scheduled user equipment based on the at least one detected frequency domain resource allocation and the number of co-scheduled user equipments;

determining a demodulation reference signal port for the co-scheduled user equipment based on the at least one detected demodulation reference signal port and the number of co-scheduled user equipments;

obtaining channel estimates for the demodulation reference signal port;

equalizing the one or more resource elements having zero power on the frequency domain resource allocation for the demodulation reference signal port;

constructing a custom constellation grid for a possible modulation order for the co-scheduled user equipment;

slicing the one or more equalized resource elements based on the custom constellation grid; and determining a modulation order for the co-scheduled user equipment based on a comparison of one or more predetermined modulation order fingerprints with the one or more sliced and equalized resource elements.

16. The method of claim 15, wherein the one or more resource elements comprise a set of resource elements that belong together, and wherein the set of resource elements is configured to be triggered with a single trigger, and wherein the aperiodic indication is further configured to indicate the number of co-scheduled user equipments in the physical downlink shared channel.

17. The method of claim 16, wherein the custom constellation grid is constructed for a maximum modulation order possible for the co-scheduled user equipment.

18. The method of claim 16, wherein the custom constellation grid is constructed for a modulation order below a maximum modulation order possible for the co-scheduled user equipment.

19. The method of claim 18, wherein determining the modulation order for the co-scheduled user equipment comprises:

correlating a histogram of the custom constellation grid with reference histograms for one or more possible modulation orders for the co-scheduled user equipment; and determining a modulation order associated with a reference histogram with a highest correlation value as the modulation order for the co-scheduled user equipment.

20. The method of claim 19, further comprising determining that the number of co-scheduled user equipments in the physical downlink shared channel is zero in response to the number of the one or more resource elements triggered with the aperiodic indication being zero.

* * * * *